United States Patent [19]
Mullins

[11] Patent Number: 4,972,355
[45] Date of Patent: Nov. 20, 1990

[54] METHOD FOR RADIOTELEPHONE AUTONOMOUS REGISTRATION

[75] Inventor: Jeffery L. Mullins, Palatine, Ill.

[73] Assignee: Motorola, Inc., Schaumburg, Ill.

[21] Appl. No.: 416,208

[22] Filed: Oct. 2, 1989

[51] Int. Cl.$^5$ .............................................. H04Q 7/04
[52] U.S. Cl. ........................................ 379/59; 379/63
[58] Field of Search ............... 379/58, 59, 60, 61, 379/62, 63, 91; 455/33

[56] References Cited

U.S. PATENT DOCUMENTS

| | | | |
|---|---|---|---|
| 4,724,537 | 2/1989 | Monet | 379/58 |
| 4,736,404 | 4/1988 | Anglikowski et al. | 379/62 |
| 4,768,220 | 8/1988 | Yoshihara et al. | 379/63 |
| 4,775,995 | 10/1988 | Chapman et al. | 379/58 |
| 4,775,999 | 10/1988 | Williams | 379/59 |
| 4,805,203 | 2/1989 | Oda | 379/61 |
| 4,821,310 | 4/1989 | Lynk, Jr. et al. | 379/63 |
| 4,837,858 | 6/1989 | Ablav et al. | 455/34 |
| 4,843,622 | 6/1989 | Yotsutani et al. | 379/59 |
| 4,852,148 | 7/1989 | Shibata et al. | 379/59 |
| 4,876,708 | 10/1989 | Saegusa | 379/61 |

FOREIGN PATENT DOCUMENTS 0055097 6/1982 European Pat. Off. .
0295678 12/1988 European Pat. Off. .

*Primary Examiner*—Robert Lev
*Attorney, Agent, or Firm*—Rolland R. Hackbart

[57] ABSTRACT

A cellular radiotelephone autonomous registration method. The radiotelephone attempts registration when a clock count transmitted by the system equals or exceeds the radiotelephone's threshold count (201). The radiotelephone then scans (202) available channels for proper signal strength and attempts to seize that channel (203). If the channel seizure fails, the threshold count is updated with the clock count plus a random integer (207) and the next channel seizure attempt is made when the next master clock value equals or exceeds this value. This method increases the length of time between failed channel seizure attempts, thereby decreasing the load on the radiotelephone's power source.

15 Claims, 3 Drawing Sheets

METHOD FOR RADIOTELEPHONE AUTONOMOUS REGISTRATION

FIELD OF THE INVENTION

This invention relates generally to the cellular radiotelephone communications field and particularly to the autonomous registration seizure attempts of a cellular radiotelephone device.

BACKGROUND OF THE INVENTION

A cellular radiotelephone operating in a cellular communications system must identify itself to the system servicing the radiotelephone, allowing the system to interface the radiotelephone to the landline telephone system. The identification typically informs the system that the radiotelephone is active in that particular system in addition to telling the system the telephone number assigned to the radiotelephone. This identification is accomplished when the radiotelephone is powered up and receiving but not transmitting, in other words, in an idle state.

Autonomous registration is such an identification method (U.S. Pat. No. 4,775,999 to Williams, assigned to Motorola, describes such a registration method). This registration is performed at various time intervals to indicate that the radiotelephone is active in the system. The time interval is determined by the system's master clock and the next registration count maintained by the radiotelephone.

The master clock value is transmitted by the cellular system, at regular intervals, to all the radiotelephones being operated within the system via the registration identification message. This clock, counting at a set rate, is typically the same throughout the entire cellular system within a metropolitan area.

The radiotelephone's next registration count is a threshold count used to determine when the next autonomous registration will occur. When the radiotelephone receives the master clock count from the system, it compares the clock count to the next registration count. If the clock count is equal to or past the next registration count, a register condition is detected and the radiotelephone will attempt to access the system to accomplish the registration process. A number of steps, as illustrated in FIG. 1, must be performed for a successful registration.

First, the radiotelephone receives the master clock data from a channel and compares it to the next registration threshold value (A) to determine if registration should be performed. This process is continued until the master clock value equals or exceeds the threshold.

Second, the radiotelephone rescans (F) the channels to determine if it still has the best channel. Due to the mobility of the radiotelephone, it may have moved out of one cell's coverage area into another since the last scan. The quality of the channel's signal is determined by signal strength.

Third, the radiotelephone attempts (B), for a predefined number of times until successful, to seize the best channel. Every time the radiotelephone attempts seizure it turns on its carrier and typically transmits its telephone number to the system. The system may also require the radiotelephone to transmit its serial number at this time. This step is a handshaking process between the system and the radiotelephone.

Fourth, the radiotelephone waits (C) a predetermined length of time for the system to acknowledge that it correctly received the registration information from the radiotelephone. A typical length of time the radiotelephone waits is five seconds. If the system answers back, within this time, that it correctly received the information from the radiotelephone, a successful registration has occurred.

Upon a successful registration (D), the next registration threshold in the radiotelephone is replaced by the master clock count that triggered the registration process added to an offset. This count, that varies between different systems, is typically an hour. Once the threshold is updated, the radiotelephone returns to the idle state until the next master clock count that passes the next registration threshold is received, causing the entire registration process to occur again.

If the registration is not confirmed, the next registration threshold is replaced by the master clock count that triggered the registration process typically added to a random offset (G). Once this is done, the radiotelephone returns to the idle state, waiting for the next registration.

The problem with the present method of registration occurs when the radiotelephone is unable to successfully seize a channel (B). Unsuccessful seizure can occur in poor cellular coverage areas. If this situation arises, the radiotelephone will repetitively attempt to seize a channel upon receipt of the next master clock value, typically within eight seconds of the last failed attempt. This occurs because the next registration threshold is not updated with a new threshold. In this case, the old threshold is being compared to the new master clock value received and the new clock value will always exceed the next registration threshold, therefore requiring another registration attempt immediately.

During each attempt to seize the channel the radiotelephone is turning on its transmitter to transmit its telephone number to the system. Each time the transmitter is turned on, extra power is required to drive it. This is typically not a problem with mobile radiotelephones where the vehicle electrical system provides virtually limitless power. In battery powered portable and transportable radiotelephones, however, these repetitive seizure attempts will increase battery drain, thereby shortening the operation time of the radiotelephone's battery.

There is therefore a need for a method of autonomous registration that increases the length of time between a radiotelephone's failed registration attempts, thereby reducing the power drain on battery dependent radiotelephones.

SUMMARY OF THE INVENTION

The invention disclosed herein is a method for autonomous registration of a radiotelephone within a cellular communications system. The method consists of monitoring communications channels for the receipt of a clock count from the system. The received clock count is compared to the radiotelephone's registration count. If the clock count is larger, the radiotelephone continues with the registration procedure. If the count is smaller, the radiotelephone continuously monitors the channels until a larger count is received.

The registration procedure begins with the radiotelephone attempting to seize a channel, turning on the carrier each time an attempt is made. The radiotelephone will attempt a predetermined number of times to seize a channel. If it is successful, it waits a predetermined length of time for the system to answer back, confirming the information sent by the radiotelephone. Once confirmed, the radiotelephone's registration threshold count is replaced by the master clock count that triggered the registration process added to an offset and the radiotelephone returns to an idle state until a clock count is received that matches or exceeds the new threshold count.

If the radiotelephone is not successful in seizing a channel, the carrier is turned off and the registration count is replaced by the master clock count added to either a random count, a fixed count, or a real time value, depending upon the embodiment in use. Once the registration count is updated, the radiotelephone returns to the idle state until a clock count is received that matches or exceeds the new threshold count.

By using this method of autonomous registration, the seizure attempts by the radiotelephone can be reduced by approximately 80% since the radiotelephone will wait an average of five clock counts before another attempt. This reduces the drain on the radiotelephone's battery, thereby allowing the battery to perform for its entire operational time.

BEST MODE FOR CARRYING OUT THE INVENTION

The method of autonomous registration for a radiotelephone in a cellular radiotelephone communications system increases the time between the failed registration attempts by the radiotelephone, thereby reducing the number of times the radiotelephone's transmitter is activated for registration. This in turn reduces the drain on the radiotelephone's power source.

Figure 1:
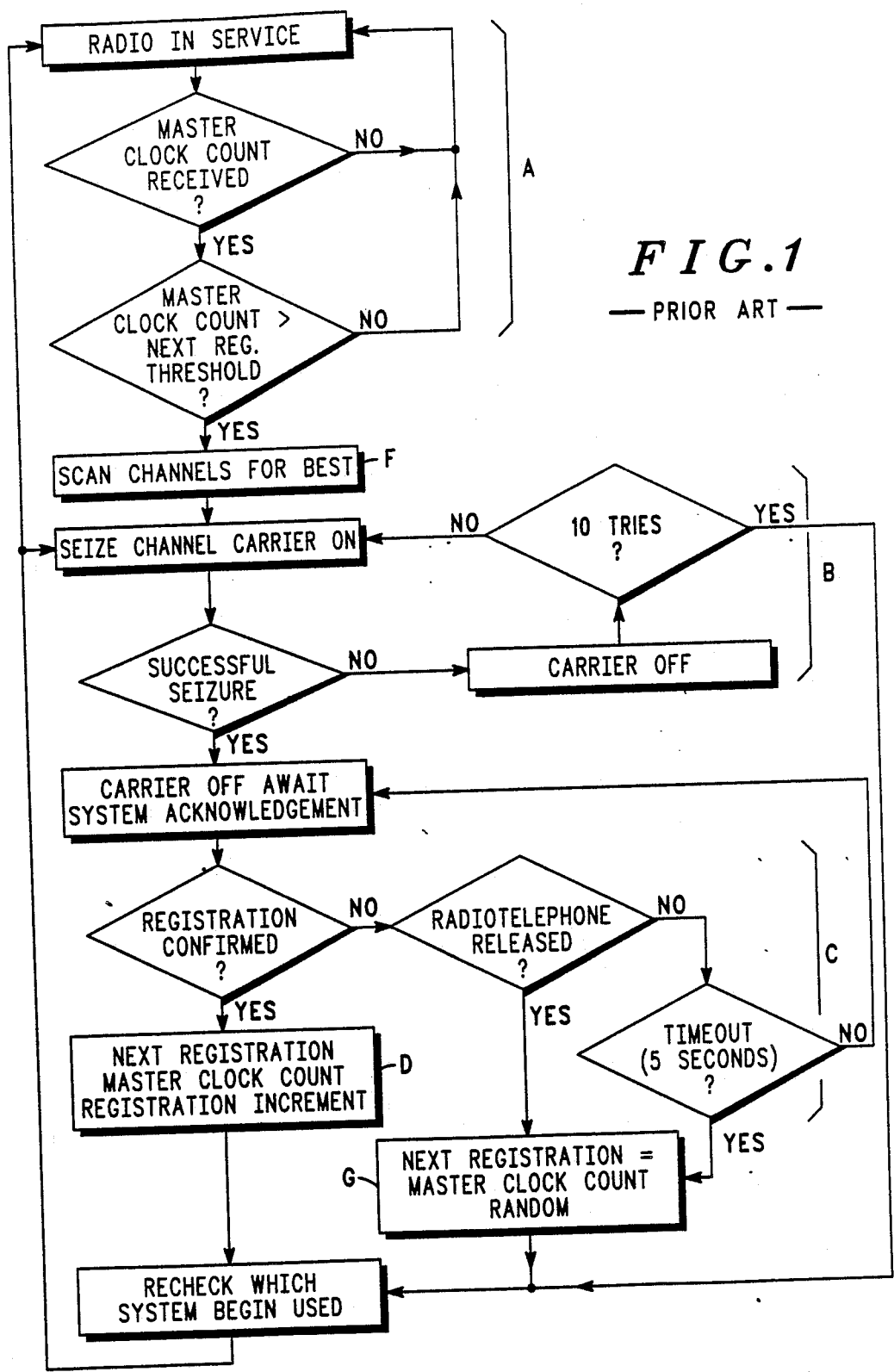
FIG. 1 illustrates the prior art method of autonomous registration.
Figure 2:
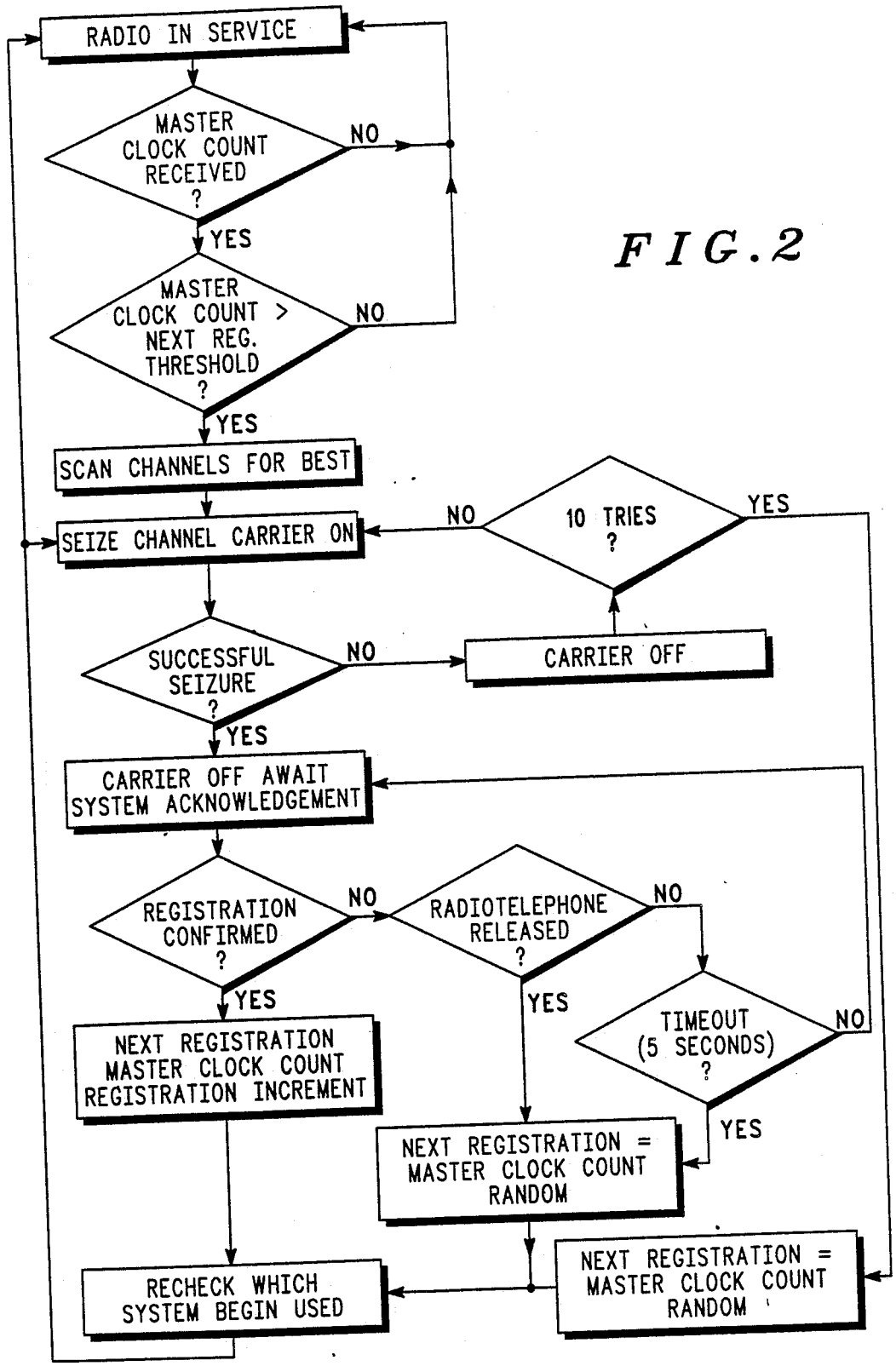
FIG. 2 illustrates the preferred embodiment in accordance with the present invention.
Figure 3:
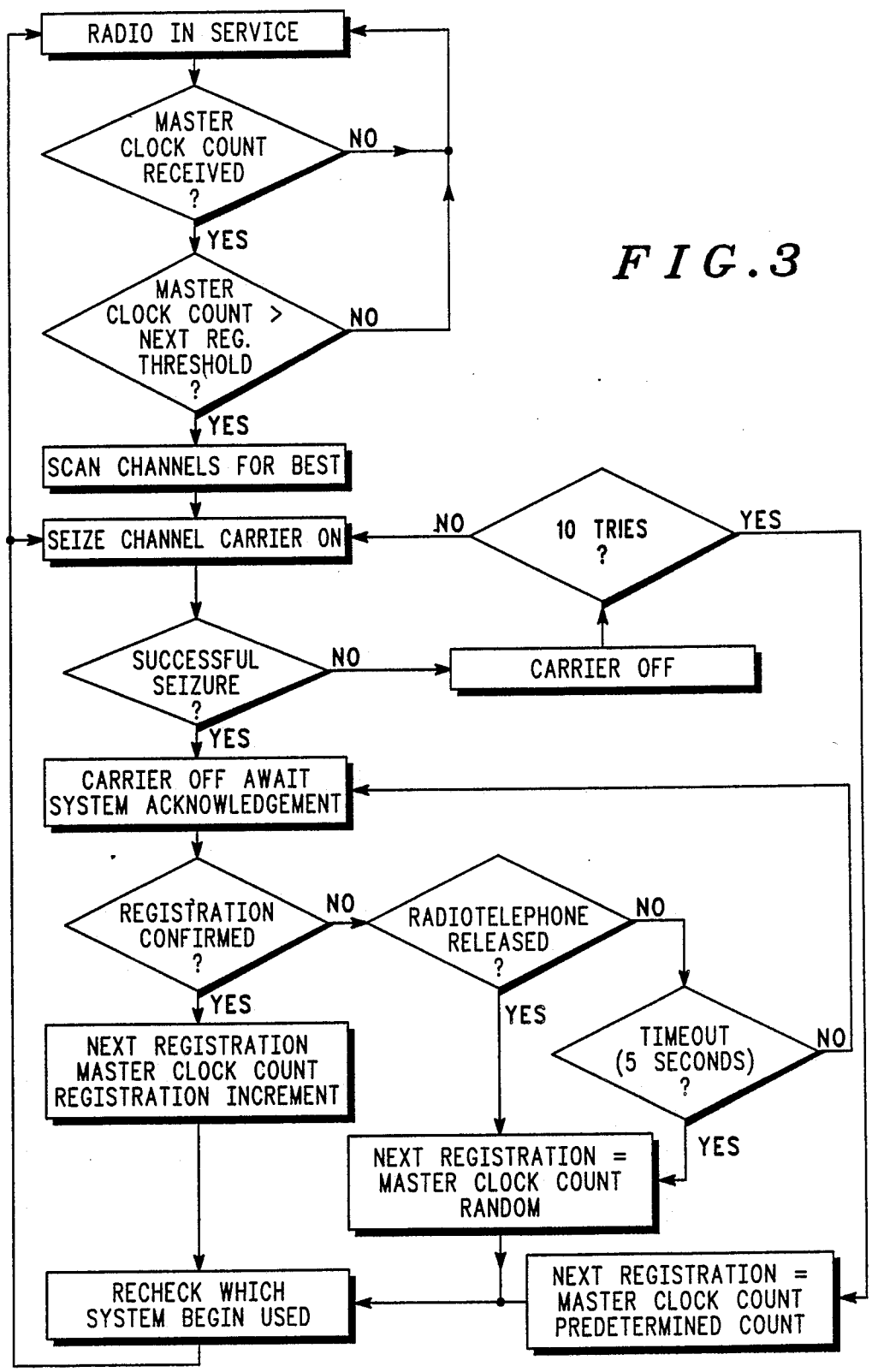
FIG. 3 illustrates an alternate embodiment in accordance with the present invention.

Referrring to FIG. 2, the autonomous registration procedure is initiated by the radiotelephone receiving a master clock count that is equal to or greater than the next registration threshold value for the radiotelephone (201). The radiotelephone then rescans (202) a set of predetermined system channels to determine if it still has the best channel, measured by the signal strength.

The radiotelephone next attempts to seize this channel (203). The radiotelephone will typically attempt to seize the channel ten times. During these channel seizure attempts, the radiotelephone will turn its transmitter on and transmit its telephone number to the system. In addition, the system may also require the radiotelephone to transmit its serial number at this time.

If the system acknowledges that the seizure was successful, the radiotelephone now waits (204) a predetermined length of time, typically five seconds, for the system to acknowledge that the radiotelephone has completed a successful registration. If the system answers back, within the predetermined length of time, that the radiotelephone has been registered, a successful registration has occured.

Upon a successful registration (205), the next registration threshold in the radiotelephone is updated by adding an offset to the master clock count that triggered the registration process. This count could be an hour depending upon the system. Once the threshold is updated, the radiotelephone returns to the idle state until the next master clock count that passes the threshold is received, causing the entire registration process to occur again.

If the system does not confirm the registration, the next registration threshold is replaced by the master clock count that triggered the registration process added to a random offset count (208). Once this is done, the radiotelephone returns to the idle state, waiting for the next master clock count to equal or exceed this value.

If the radiotelephone cannot successfully seize a channel (206) within ten attempts, the next registration threshold is updated (207) with a delay time added to the count of the master clock that was received. The delay time, in the preferred embodiment, is a random integer within the range of zero to ten. After the next registration threshold is updated, the radiotelephone returns to the idle state (208) for the length of time specified by the new next registration threshold. This length of time is until a master clock count is received that equals or exceeds the new next registration threshold (201) when the autonomous registration process starts over.

The delay time (301), in an alternate embodiment, can also be a predetermined length of time or count. This predetermined time can be any integer.

This method of autonomous registration can reduce the number of seizure attempts typically made by a radiotelephone in a poor coverage area by eighty percent over the prior art. This is a result of the radiotelephone waiting an average of five master clock counts before making another registration attempt. The reduced number of registration attempts means a reduction in the number of times the radiotelephone's transmitter is turned on, thereby reducing the power drain on the radiotelephone's power source. For battery operated radiotelephone's, this translates into allowing the radiotelephone to operate for its rated battery life.

Those skilled in the art will recognize that various modifications and changes could be made to the invention without departing from the spirit and scope thereof. It should therefore be understood that the claims are not to be considered as being limited to the precise embodiments set forth in the absence of specific limitations directed to such embodiments.

I claim:

1. A method for autonomous registration of a radiotelephone device in a radiotelephone communications system having a plurality of radio channels, the radiotelephone device receiving registration information on at least one radio channel and transmitting registration information on at least one radio channel when the radiotelephone device receives a clock count on a radio channel, equal to or exceeding a next registration threshold count, wherein the method comprises the steps of:

(A) scanning the plurality of radio channels and attempting to seize a best channel of the plurality of channels, repeating step (A) until successful but no more than a predetermined number of times;

(B) if the best channel is not successfully seized after the predetermined number of times, replacing the next registration threshold count by a first incremental amount, waiting for the clock count to equal or exceed the next registration threshold count, and repeating from step (A);

(C) waiting for receipt of a registration confirmation value for a predetermined length of time;

(D) if the registration confirmation value is received in a time less than the predetermined length of time, replacing the next registration threshold count by a second incremental amount, waiting for the clock count to equal or exceed the next registration threshold count, and repeating from step (A); and (E) replacing the next registration threshold count by a third incremental amount, waiting for the clock count to equal or exceed the next registration threshold count, and repeating from step (A).

2. The method of claim 1 wherein the predetermined number of times is ten.

3. The method of claim 1 wherein the first incremental amount is a random number added to the clock count.

4. The method of claim 3 wherein the random number is an integer substantially in a range of zero to ten.

5. The method of claim 1 wherein the second incremental amount is an integer substantially equal to a real time amount of one hour.

6. The method of claim 1 wherein the third incremental amount is a random number added to the clock count.

7. The method of claim 6 wherein the random number is an integer substantially in a range of zero to ten.

8. The method of claim 1 wherein the predetermined length of time is five seconds.

9. The method of claim 1 wherein the first incremental amount is a predetermined number.

10. The method of claim 9 wherein the predetermined number is an integer substantially in a range of zero to ten.

11. A method for autonomous registration of a radiotelephone device in a radiotelephone communications system having a plurality of radio channels, the radiotelephone device receiving registration information on at least one radio channel and transmitting registration information on at least one radio channel when the radiotelephone device receives a clock count on a radio channel, equal to or exceeding a next registration threshold count, wherein the method comprises the step of:

(A) scanning the plurality of radio channels and attempting to seize a best channel of the plurality of channels, repeating step (A) until successful but no more than ten times;

(B) if the best channel is not successfully seized after ten times, replacing the next registration threshold count by a first incremental amount, waiting for the clock count to equal or exceed the next registration threshold count, and repeating from step (A);

(C) waiting for receipt of a registration confirmation value for five seconds;

(D) if the registration confirmation value is received in a times less than five seconds, replacing the next registration threshold count by an integer substantially equal to a real time value of one hour, waiting for the clock count to equal or exceed the next registration threshold count, and repeating from step (A); and (E) replacing the next registration threshold count by a value equal to a random number added to the clock count, waiting for the clock to equal or exceed the next registration threshold count, and a repeating from step (A).

12. The method of claim 11 wherein the first incremental amount is a random number added to the master clock.

13. The method of claim 12 wherein the random number is an integer substantially in a range of zero to ten.

14. The method of claim 11 wherein the first incremental amount is a predetermined number.

15. The method of claim 14 wherein the predetermined number is an integer substantially in a range of zero to ten.

* * * * *

UNITED STATES PATENT AND TRADEMARK OFFICE
CERTIFICATE OF CORRECTION

PATENT NO. : 4,972,355

DATED : November 20, 1990

INVENTOR(S) : Jeffery L. Mullins

It is certified that error appears in the above-identified patent and that said Letters Patent is hereby corrected as shown below:

In Column 6, line 27, please change "clock to equal" to --clock count to equal--.

In Column 6, line 28, please delete "a".

Signed and Sealed this

Second Day of June, 1992

Attest:

DOUGLAS B. COMER

*Attesting Officer*  *Acting Commissioner of Patents and Trademarks*